(12) United States Patent
Sugita

(10) Patent No.: US 9,846,561 B2
(45) Date of Patent: Dec. 19, 2017

(54) IMAGE FORMING APPARATUS, METHOD OF CONTROLLING THE SAME, STORAGE MEDIUM, AND INFORMATION PROCESSING APPARATUS COMMUNICATING WITH IMAGE FORMING APPARATUS FOR SAVING A TRANSMISSION HISTORY BASED ON A USER INSTRUCTION

(71) Applicant: CANON KABUSHIKI KAISHA, Tokyo (JP)

(72) Inventor: Hikaru Sugita, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/050,804

(22) Filed: Feb. 23, 2016

(65) Prior Publication Data

US 2016/0269573 A1    Sep. 15, 2016

(30) Foreign Application Priority Data

Mar. 10, 2015   (JP) .................. 2015-047414

(51) Int. Cl.
*G06F 3/12* (2006.01)
*H04N 1/32* (2006.01)

(52) U.S. Cl.
CPC ....... *G06F 3/1292* (2013.01); *H04N 1/32641* (2013.01); *H04N 1/32662* (2013.01)

(58) Field of Classification Search
None
See application file for complete search history.

(56) References Cited

U.S. PATENT DOCUMENTS

| 2005/0270558 | A1* | 12/2005 | Konsella | H04L 12/5835 358/1.15 |
| 2006/0028661 | A1* | 2/2006 | Uruma | H04N 1/00408 358/1.6 |
| 2006/0135202 | A1* | 6/2006 | Ho | H04M 1/72547 455/556.2 |
| 2006/0170963 | A1* | 8/2006 | Aoki | G06F 3/1204 358/1.15 |
| 2007/0264972 | A1* | 11/2007 | Stark | H04M 1/2745 455/410 |
| 2008/0082852 | A1* | 4/2008 | Denpo | G06F 1/263 713/340 |
| 2009/0100071 | A1* | 4/2009 | Kobayashi | H04N 1/00244 |

(Continued)

FOREIGN PATENT DOCUMENTS

JP     2011-182242 A    9/2011

*Primary Examiner* — Ming Hon
(74) *Attorney, Agent, or Firm* — Fitzpatrick, Cella, Harper & Scinto

(57) ABSTRACT

A technique for saving a setting of a transmission job as a setting history for a call function as needed by a user when an information processing apparatus such as an image processing apparatus (MFP) has executed the transmission job is provided. Upon executing a transmission job received from a mobile device, the MFP determines in accordance with an instruction by a user as to whether to save a setting of the transmission job as a setting history (transmission history) for a call function that reuses a setting of a job executed in the past to execute a job. For a setting of a transmission job for which it is determined not to save as a setting history for the call function, the MFP prohibits saving as a setting history.

6 Claims, 10 Drawing Sheets

(56) References Cited

U.S. PATENT DOCUMENTS

| | | | |
|---|---|---|---|
| 2009/0168115 A1* | 7/2009 | Kunii | G06F 17/30265 358/444 |
| 2009/0289917 A1* | 11/2009 | Saunders | G06F 3/0482 345/174 |
| 2009/0323915 A1* | 12/2009 | Sasaki | H04M 1/56 379/112.01 |
| 2011/0134459 A1* | 6/2011 | Funane | G06F 3/0619 358/1.14 |
| 2011/0216339 A1 | 9/2011 | Kasahara | 358/1.13 |
| 2011/0235095 A1* | 9/2011 | Kudo | H04N 1/32614 358/1.15 |
| 2011/0267649 A1* | 11/2011 | Akimoto | H04L 12/58 358/1.15 |
| 2011/0292426 A1* | 12/2011 | Sasano | H04N 1/00212 358/1.13 |
| 2012/0096389 A1* | 4/2012 | Flam | G06F 17/3089 715/777 |
| 2013/0057908 A1* | 3/2013 | Park | H04L 61/2015 358/1.15 |
| 2014/0233072 A1* | 8/2014 | Kawabata | H04N 1/00209 358/407 |

* cited by examiner

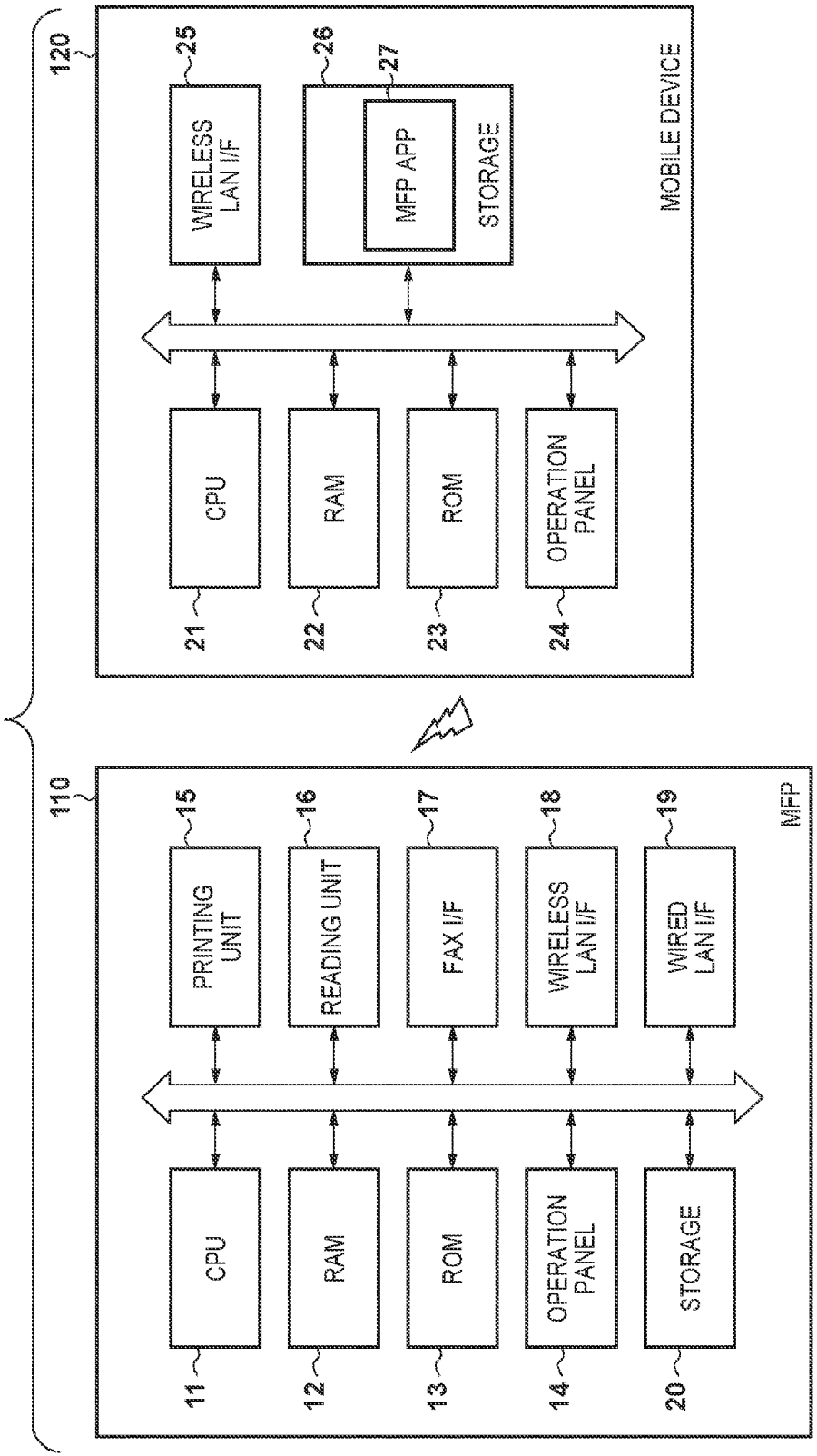

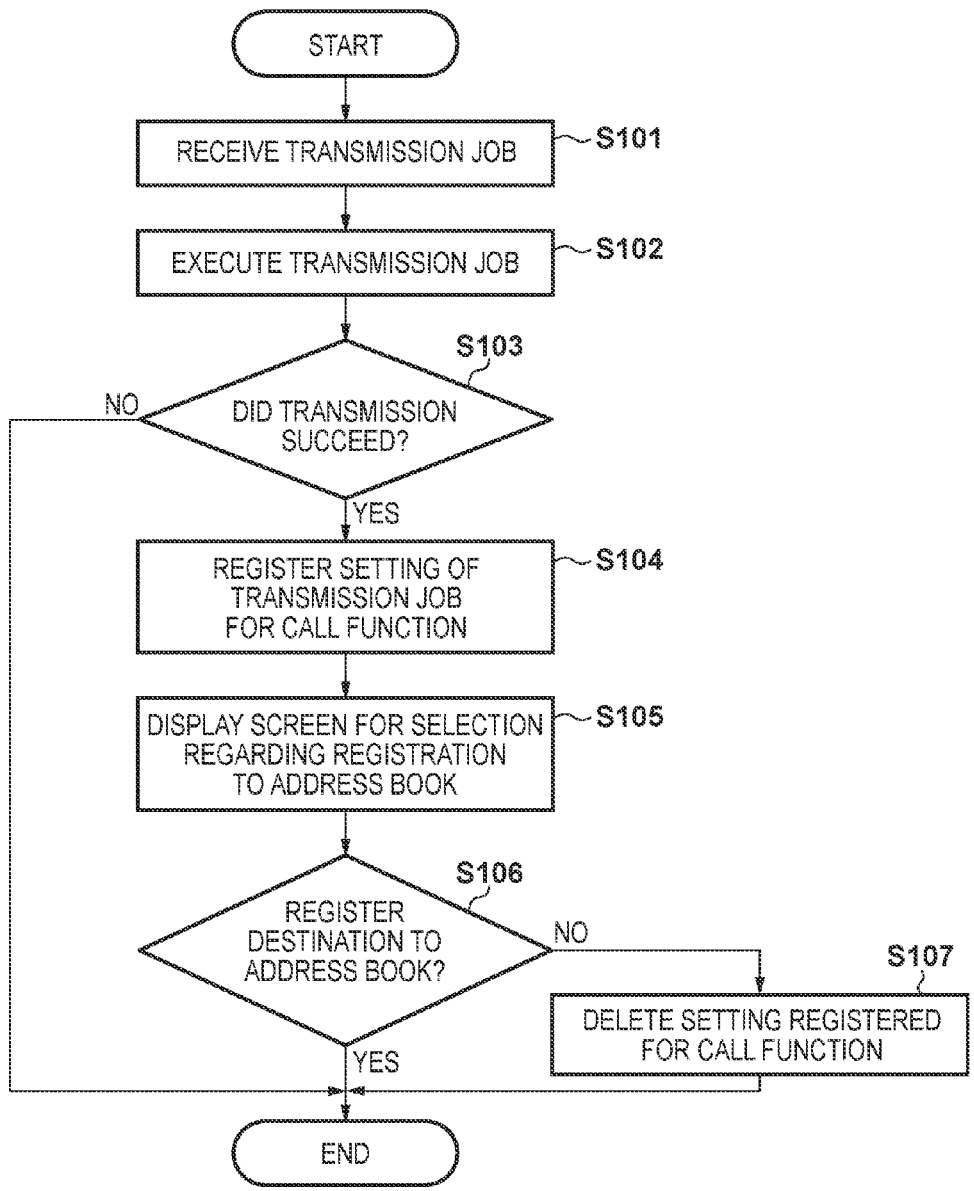

IMAGE FORMING APPARATUS, METHOD OF CONTROLLING THE SAME, STORAGE MEDIUM, AND INFORMATION PROCESSING APPARATUS COMMUNICATING WITH IMAGE FORMING APPARATUS FOR SAVING A TRANSMISSION HISTORY BASED ON A USER INSTRUCTION

BACKGROUND OF THE INVENTION

Field of the Invention

The present invention relates to an information processing apparatus, a method of controlling the same, and a storage medium.

Description of the Related Art

In recent years, a technique that inputs jobs to be executed on an image processing apparatus, such as a scanner or a printer, to the image processing apparatus from an information processing apparatus (a terminal device), such as a smart phone or a tablet PC is known. Among such jobs, there is a transmission job for transmitting data to an external apparatus in accordance with a facsimile (FAX) transmission, an electronic mail transmission, or the like. In the transmission job, designation of a transmission destination of the data (a destination) can be performed by using information registered in an address book held by an information processing apparatus or an image processing apparatus.

In addition, as one function of an image processing apparatus, a function in which content of previously performed processing is saved as a setting history that can be called again, and the processing is performed again by calling the saved setting history (hereinafter, referred to as a "call function".) is known. If an image processing apparatus having such a function executes a transmission job, information on a transmission destination that indicates a transmission destination designated by the transmission job is saved as a setting history for the call function. However, from a security perspective, it is not desirable for such information on a transmission destination to be used by a user different from the user of the information processing apparatus who input the transmission job.

Japanese Patent Laid-Open No. 2011-182242 proposes a technique to deal with such a security problem. The patent literature discloses an image processing apparatus that, if it has executed a process definition file that defines content of a plurality of processes to be executed, does not save the content of the process definition file as a setting history for the call function. With this, a process definition file which is used by a user is prevented from being used by a separate user.

However, if, by the technique recited in Japanese Patent Laid-Open No. 2011-182242 for example, a setting of a transmission job (setting of a transmission destination) is made to not be saved as a setting history for the call function, it becomes impossible to reuse settings of various transmission jobs by the call function. In such a case, convenience for the user is lowered because a need to re-input the setting arises even when a user wishes to reuse a setting of a transmission job by the call function.

SUMMARY OF THE INVENTION

The present invention was conceived in view of the above described issues. The present invention provides a technique for saving a setting of a transmission job as a setting history for a call function as needed by a user, when an information processing apparatus such as an image processing apparatus has executed the transmission job.

According to one aspect of the present invention, there is provided an information processing apparatus comprising: a transmission unit configured to transmit data; a storage unit configured to store in a callable manner a transmission history that includes a destination of data transmitted by the transmission unit; a reception unit configured to receive a destination of data from an external apparatus; and a determination unit configured to determine, in accordance with the transmission unit transmitting data to the destination received by the reception unit, whether to store the destination as the transmission history in the storage unit based on an instruction by a user.

According to another aspect of the present invention, there is provided a method of controlling an information processing apparatus, the method comprising: transmitting data; storing in a callable manner, in a storage unit, a transmission history that includes a destination of data transmitted in the transmitting; receiving a destination of data from an external apparatus; and determining, in accordance with data being transmitted to the received destination, whether to store the destination as the transmission history in the storage unit based on an instruction by a user.

According to still another aspect of the present invention, there is provided a non-transitory computer-readable storage medium storing a computer program for causing a computer to execute a method of controlling an information processing apparatus, the method comprising: transmitting data; storing in a callable manner, in a storage unit, a transmission history that includes a destination of data transmitted in the transmitting; receiving a destination of data from an external apparatus; and determining, in accordance with data being transmitted to the received destination, whether to store the destination as the transmission history in the storage unit based on an instruction by a user.

By virtue of the present invention, it becomes possible to save a setting of a transmission job as a setting history for a call function as needed by a user, when an information processing apparatus has executed the transmission job. In particular, when a setting of a destination is included in a transmission job that is received from an external apparatus such as a terminal device, it is possible to control whether to save the destination as a setting history for the call function in accordance with the intention of a user.

Further features of the present invention will become apparent from the following description of exemplary embodiments (with reference to the attached drawings).

BRIEF DESCRIPTION OF THE DRAWINGS

FIG. 1 is a block diagram for illustrating an example configuration of an image processing system.

FIG. 3 is a flowchart illustrating a procedure of processing executed by an MFP according to a first embodiment.

DESCRIPTION OF THE EMBODIMENTS

Figure 2A:
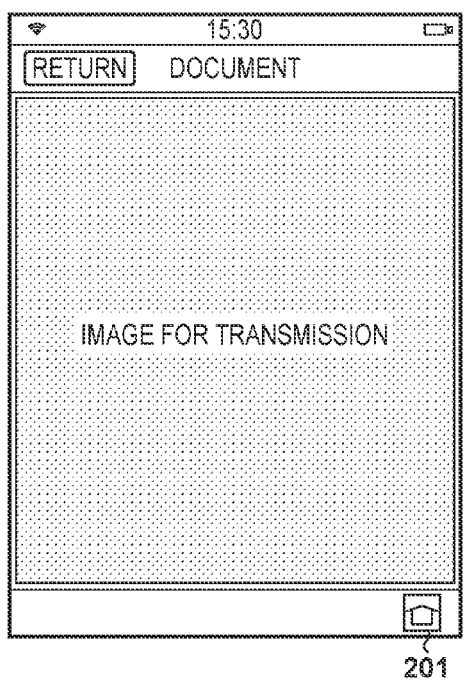
FIG. 2A to FIG. 2C are views for illustrating examples of operation screens of a mobile device.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Below, as an example of an information processing apparatus, explanation is given for embodiments that relate to a Multi Function Peripheral (MFP) equipped with various functions, such as a print function, a scan function, or a FAX function. In addition, as an example of an external apparatus, explanation is given for embodiments in relation to a mobile device (a terminal device), such as a cellular phone, a smart phone, or a tablet PC, that can use a wireless communications function to cause various jobs, such as scanning, FAX transmission, or electronic mail transmission, to be executed on the MFP. Note that FIG. 1 and FIG. 2A-FIG. 2C are common to the first through fourth embodiments.

<Configuration of Image Processing System>

FIG. 1 is a block diagram for illustrating an example configuration of an image processing system. An image processing system 100 is configured by an MFP 110 and a mobile device 120. Note that the image processing system 100 may include any number of MFPs, and any number of mobile devices.

(MFP 110)

The MFP 110 is equipped with a CPU 11, a RAM 12, a ROM 13, an operation panel 14, a printing unit 15, a reading unit 16, a facsimile (FAX) interface (I/F) 17, a wireless LAN I/F 18, a wired LAN I/F 19, and a storage 20. These devices can communicate with each other via a system bus.

The CPU 11 controls operation of the MFP 110 on the whole. The ROM 13 stores data, such as firmware, which is a control program for controlling the MFP 110, various settings, and initial values. The RAM 12 is a volatile storage device that is used as a work area in which the CPU 11 stores a control program read from the ROM 13, or as a temporary storage area in which the data is temporarily stored by the CPU 11. By executing a control program read from the ROM 13, the CPU 11 controls each device in the MFP 110. The storage 20 is for example a non-volatile storage device that is configured by a hard disk drive (HDD), and stores various data, such as an OS program, an application program, and image data.

The operation panel 14 (an operation unit) includes a display unit that displays various screens, such as a screen that indicates setting content or an operation status of the MFP 110, a screen that indicates various messages, or an operation screen for accepting an operation by a user, and an input unit for accepting an input operation by a user. The input unit includes, for example, various buttons such as an OK button for instructing a start of image processing and a cancel button for instruction a cancellation of the image processing, and a touch panel arranged on the display unit. The printing unit 15 prints an image on a sheet based on image data. The reading unit 16 reads an image of an original, and generates image data that corresponds to the image.

The FAX I/F 17 is a communication interface for the MFP 110 to communicate with an external apparatus via a public line. Via the FAX I/F 17, the MFP 110 receives FAX data transmitted from an external apparatus, and transmits FAX data to an external apparatus.

The wireless LAN I/F 18 is a communication interface for performing wireless communication with an external apparatus, based on an IEEE 802.11 standard or a similar standard. The wired LAN I/F 19 is a communication interface for performing wired communication with an external apparatus based on an IEEE 802.3 specification or a similar standard. Via the wireless LAN I/F 18 or the wired LAN I/F 19, the MFP 110 receives data transmitted from an external apparatus, or transmits data to an external apparatus.

In the image processing system 100, the MFP 110 can communicate with the mobile device 120 via the wireless LAN I/F 18 or the wired LAN I/F 19. For example, the MFP 110 performs a wireless connection, via the wireless LAN I/F 18, to a router or a wireless LAN access point (not shown), and communicates with the mobile device 120 via the router or wireless LAN access point. Alternatively, via the wireless LAN I/F 18, the MFP 110 may directly communicate with the mobile device 120, for example, by a wireless communication in accordance with a Wi-Fi Direct standard. Also, the MFP 110 may perform a wired connection, via the wired LAN I/F 19, to a router or a wireless LAN access point (not shown), and communicate with the mobile device 120 via the router or wireless LAN access point.

(Mobile Device 120)

The mobile device 120 is equipped with a CPU 21, a RAM 22, a ROM 23, an operation panel 24, a wireless LAN I/F 25, and a storage 26. These devices can communicate with each other via a system bus.

The CPU 21 controls operation of the mobile device 120 on the whole. The ROM 23 stores data, such as firmware, which is a control program for controlling the mobile device 120, various settings, and initial values. The RAM 22 is a volatile memory that is used as a work area in which the CPU 21 stores a control program read from the ROM 23, or as a temporary storage area in which the data is temporarily stored by the CPU 21. By executing a control program read from the ROM 23, the CPU 21 controls each device in the mobile device 120.

The operation panel 24 is an operation panel of a touch panel format that has both a display function and an input function. The wireless LAN I/F 25 is a communication interface for performing wireless communication with an external apparatus, based on an IEEE 802.11 standard or a similar standard.

In the image processing system 100, the mobile device 120 can communicate with the MFP 110 via the wireless LAN I/F 25. For example, the mobile device 120 performs a wireless connection, via the wireless LAN I/F 25, to a router or a wireless LAN access point (not shown), and communicates with the MFP 110 via the router or wireless LAN access point. Alternatively, via the wireless LAN I/F 18, the MFP 110 may perform direct communication with the mobile device 120, for example, by a wireless communication in accordance with a Wi-Fi Direct standard.

The storage 26 is a non-volatile storage device that stores various data, such as an OS program, an application program, and image data. For example, the storage 26 stores programs, such as a Web browser for obtaining a file from a server on a network and viewing the obtained file, and device drivers for controlling various devices. In addition, a program of an MFP application (MFP app) 27 for causing, based on data stored in the storage 26, processing such as printing, FAX transmission, or electronic mail transmission, to be executed by the MFP 110 is also stored in the storage 26. Note that the MFP application 27 may be installed in the mobile device 120 in advance, or may be downloaded from a predetermined server and then installed in the mobile device 120.

In accordance with a user operation on an operation screen displayed on the operation panel 24, the MFP application 27 generates a job such as for printing, FAX transmission, or electronic mail transmission, based on data selected by the user. Furthermore, the MFP application 27 causes the MFP 110 to execute the job by establishing a communication link with the MFP 110, and transmitting the generated job to the MFP 110 via the established communication link.

<Mobile Device Operation Screen Example>

Figure 2B:
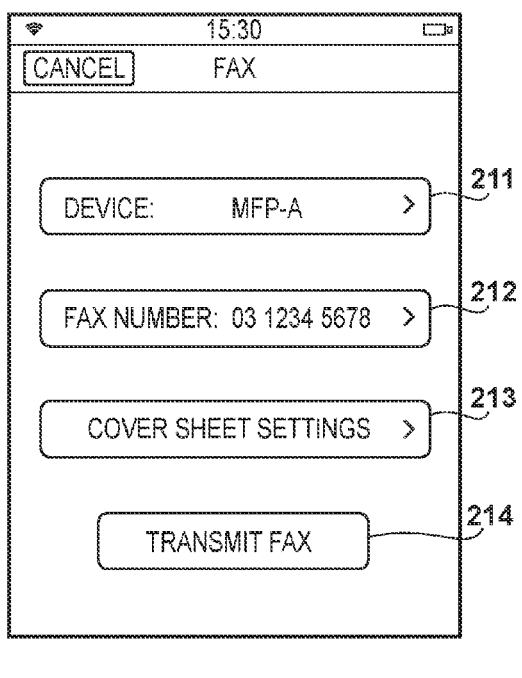
Figure 2C:
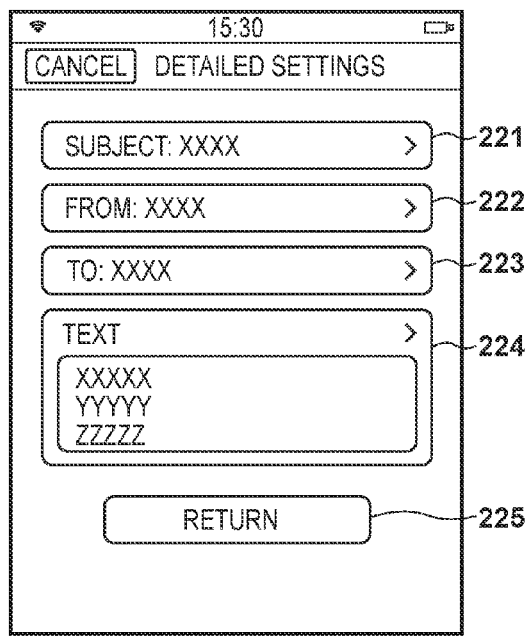

FIGS. 2A-2C are views for illustrating examples of operation screens of the MFP application 27, which are displayed on the operation panel 24 in the mobile device 120. Display of each operation screen illustrated in each of FIGS. 2A-2C is realized as a function of the MFP application 27, by the CPU 21 reading a program of the MFP application 27 from the storage 26 and executing it.

FIG. 2A illustrates an operation screen that displays an image for transmission by a transmission job that is caused to be executed by the MFP 110. In this operation screen, when a user presses an operation key 201, the MFP application 27 (the CPU 21) displays a screen (not shown) for selecting processing to be executed on an image that is currently displayed. For example, as a candidate of processing to be executed, "print", "FAX transmission", and "electronic mail transmission" are displayed. When a user has selected "FAX transmission", the CPU 21 switches the display of the operation panel 24 to an operation screen illustrated in FIG. 2B.

FIG. 2B illustrates an operation screen for a user to perform setting to cause the MFP 110 to execute a FAX transmission. A setting field 211 is used to set (select) an MFP to execute the FAX transmission. When a user touches the setting field 211, the CPU 21 searches for MFPs present in a periphery of the mobile device 120, and displays a list of found MFPs in a state that allows selection by a user. By touching one MFP displayed in the list, a user can select an MFP to execute a FAX transmission.

A setting field 212 is used to set a telephone number (a FAX number) that indicates a destination of the FAX transmission. When a user presses a ">" portion of the setting field 212, by displaying a software keyboard on the operation panel 24, the CPU 21 causes a user to be able to input a telephone number by a key operation. Note that the CPU 21 may display an address book saved in the mobile device 120 (stored in the storage 26) on the operation panel 24, and enable input of a telephone number by using the displayed address book. A destination (telephone number) input by a user is displayed in the setting field 212.

A setting key 213 is used for performing setting in relation to a cover sheet for a FAX transmission. When a ">" portion of the setting key 213 is pressed by a user, the CPU 21 displays a setting screen (FIG. 2C) regarding the cover sheet.

A FAX transmission key 214 is used for instructing the MFP 110 to execute the FAX transmission. When the FAX transmission key 214 is pressed, the CPU 21 generates a FAX transmission job based on the content set in the setting fields 211-213, and transmits the generated job to the MFP 110. At that time, the CPU 21, by controlling the wireless LAN I/F 25, establishes a communication link with the MFP 110 and transmits the FAX transmission job to the MFP 110 via the established communication link.

FIG. 2C illustrates an operation screen for a user to perform setting in relation to a cover sheet for a FAX transmission. In this operation screen, setting fields 221-223 are respectively used to set "SUBJECT", "FROM", and "TO" of the cover sheet. When a user presses a ">" portion of the setting field 221, the CPU 21 displays a text input screen, and accepts input of "SUBJECT" from the user. The CPU 21 displays the input "SUBJECT" in the setting field 221. The same is true for the setting fields 222 and 223.

The setting field 224 is used to set the body ("TEXT") of the cover sheet. When a user presses a ">" portion of a setting field 224, the CPU 21 displays a text input screen, and accepts input of a body from the user. The CPU 21 displays the input body in the setting field 224. A key 225 is used for returning the display of the operation panel 24 to the operation screen illustrated in FIG. 2B. When a user presses the key 225, the CPU 21 switches the display of the operation panel 24 to the operation screen illustrated in FIG. 2B, and also uses the operation screen illustrated in FIG. 2C to finalize the setting of the input cover sheet.

As described above, the MFP 110 can receive a job from the mobile device 120 and execute the received job, as well as save a setting of the job as a setting history for a call function for executing a job by reusing a setting of a job that was executed in the past. In each embodiment below, explanation is given of an example in which, if the MFP 110 has received a transmission job from the mobile device 120 and executed it, a setting of the transmission job is saved as a setting history (transmission history) for the call function as needed by a user.

Specifically, when executing a transmission job, that includes a setting of a destination, for transmitting data to the set destination, determines whether to register (save) a setting of the transmission job as a setting history for the call function in accordance with an instruction by a user. Furthermore, for a setting of a transmission job for which it is determined not to save as a setting history for the call function, the MFP 110 prohibits saving as a setting history. For example, the MFP 110 deletes a setting of a transmission job for which it is determined not to save as a setting history, from settings saved as setting histories for the call function.

First Embodiment

In the first embodiment, when executing a transmission job received from the mobile device 120, the MFP 110 (the CPU 11) accepts, from a user, an instruction regarding whether to register a destination set in the transmission job in the address book that the MFP 110 holds. In the present embodiment, such acceptance processing is realized by accepting an instruction from a user via an operation screen displayed on the operation panel 14. Furthermore, the CPU 11, if instructed not to register the destination in the address book, determines not to save a setting of a transmission job as a setting history for the call function, and if registering is instructed, determines to save the setting of the transmission job as a setting history for the call function.

Below, with reference to FIG. 3, explanation is given for a detailed processing procedure in the MFP 110. FIG. 3 is a flowchart that illustrates a procedure for processing executed by the MFP 110 when a transmission job is input from the mobile device 120 according to the first embodiment. Note that processing of each step illustrated in FIG. 3 is realized in the MFP 110 by the CPU 11 reading and executing a control program stored in the ROM 13 or the storage 20.

Firstly, in step S101 the CPU 11 receives a transmission job from the mobile device 120 via the wireless LAN I/F 25. In accordance with reception of the transmission job, in step S102 the CPU 11 executes the received transmission job. In the present embodiment, explanation is given for a case in which a FAX transmission job is received. The FAX transmission job includes a FAX number that indicates a destination (transmission destination), an image to be transmitted, and a setting of a cover sheet. The CPU 11 executes a FAX transmission in accordance with the received FAX transmission job.

Next, in step S103 the CPU 11 determines whether transmission (FAX transmission) in accordance with the transmission job (the FAX transmission job) has succeeded. If the CPU 11 determines that the transmission succeeded, the processing proceeds to step S104, and if the CPU 11 determines that the transmission failed, processing is terminated.

Figure 4:
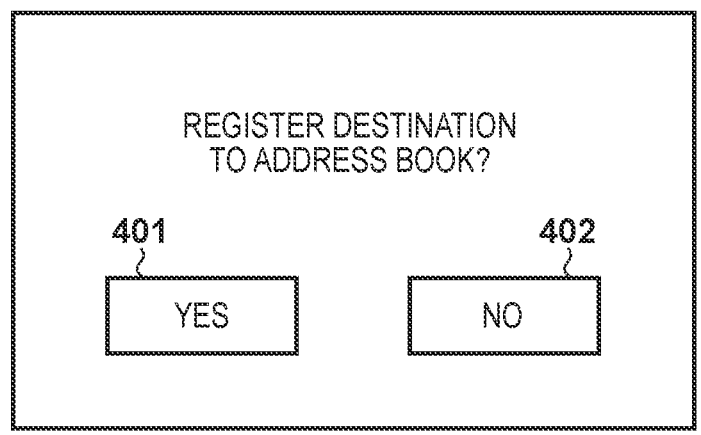
FIG. 4 is a view for illustrating an example of an operation screen displayed on the MFP or the mobile device.

In step S104, the CPU 11 registers (saves) the setting of the executed transmission job, for the call function. Furthermore, in step S105, the CPU 11 displays on the operation panel 14 a selection screen for selecting whether to register the destination included in the settings of the transmission job, in an address book that the MFP 110 holds. FIG. 4 illustrates an example of such a selection screen, and in the selection screen, a user can select whether to register or not register the destination to the address book by pressing a key 401 or a key 402.

Next, in step S106, in accordance with the selection by the user using the selection screen displayed in step S105, the CPU 11 determines whether to register the destination included in the setting of the transmission job in the address book that the MFP 110 holds. If the CPU 11 determines to register the destination in the address book, the CPU 11 registers the destination in the address book, and terminates the processing. However, if the CPU 11 determines not to register the destination in the address book, it does not register the destination in the address book, and in step S107, the CPU 11 deletes the setting that was registered for the call function (in step S104), and terminates the processing.

As explained above, by virtue of the present embodiment, if the MFP 110 receives a transmission job from the mobile device 120 and executes the received job, whether to save a setting of the transmission job as a setting history (transmission history) for the call function is determined in accordance with a selection by a user. Accordingly, it is possible to control, in accordance with an intention of a user, whether to save a destination included in a transmission job as a setting history for the call function without causing a security problem to be generated.

Second Embodiment

In the second embodiment, as a variation of the first embodiment, explanation is given of an example in which an instruction by a user for whether to register a destination set in a transmission job in an address book in the MFP 110 is received from the mobile device 120. Specifically, when executing a transmission job received from the mobile device 120, the CPU 11 queries the mobile device 120 as to whether to register the destination set in the transmission job in the address book. Furthermore, the CPU 11 receives from the mobile device 120 an instruction by a user for whether to register the destination in the address book. Note that, below, explanation is omitted for portions in common with the first embodiment.

<Processing in Mobile Device 120>

Figure 5:
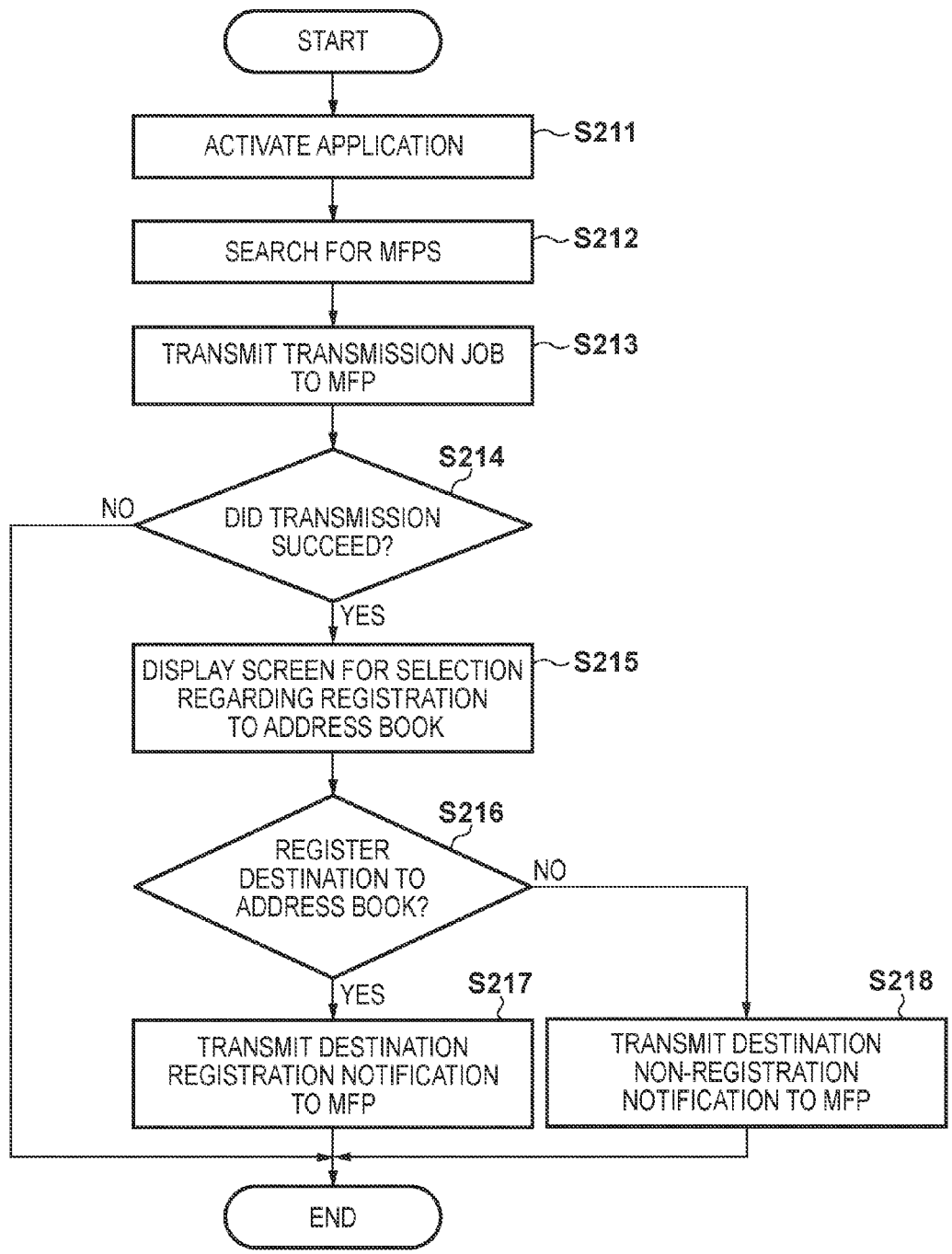
FIG. 5 is a flowchart illustrating a procedure of processing executed by the mobile device according to a second embodiment.

FIG. 5 is a flowchart illustrating a procedure of processing executed by the mobile device 120 according to the second embodiment. Note that processing of each step illustrated in FIG. 5 is realized in the mobile device 120 by the CPU 21 reading and executing a program stored in the ROM 23 or the storage 26. In addition, in the present embodiment, similarly to the first embodiment, explanation is given of an example in which, as a transmission job, a FAX transmission job is executed by the MFP 110.

Firstly, in step S211, when activation of the MFP application 27 is instructed by a user, the CPU 21 reads and executes the MFP application 27 stored in the storage 26 to activate the MFP application 27. Note that, each step below is realized as a function of the MFP application 27.

Next, in step S212, the CPU 21 searches for MFPs present in a periphery of the mobile device 120, and displays a list of found MFPs in a state in which a user can select them. Furthermore, in step S213, upon accepting settings of a transmission job (FAX transmission job) and an execution instruction from a user by using operation screens as illustrated in FIGS. 2A-2C, the CPU 21 generates a FAX transmission job and transmits it to the MFP 110.

Thereafter, in step S214, upon receiving from the MFP 110 information relating to an execution result of the transmission job by the MFP 110, the CPU 21 determines whether transmission (FAX transmission) in accordance with the transmission job (FAX transmission job) in the MFP 110 has succeeded. If the CPU 21 determines that the transmission succeeded, the processing proceeds to step S215, and if the CPU 21 determines that the transmission failed, processing is terminated.

In step S215, the CPU 21 displays, on the operation panel 24, a selection screen for selecting whether to register the destination included in the settings of the transmission job in an address book that the MFP 110 holds. Similarly to the first embodiment, the CPU 21 displays a selection screen as illustrated in FIG. 4, and in the selection screen, by pressing the key 401 or the key 402, a user can select whether to register the destination in the address book or not register it.

Next, in step S216, in accordance with the selection by the user using the selection screen displayed in step S215, the CPU 21 determines whether to register the destination included in the setting of the transmission job in the address book that the MFP 110 holds. If the CPU 21 determines to register the destination in the address book, in step S217, it transmits to the MFP 110 a destination registration notification indicating that the destination is to be registered in the address book, and processing terminates. Meanwhile, if the CPU 21 determines not to register the destination in the address book, in step S218, it transmits to the MFP 110 a destination non-registration notification indicating that the destination is not to be registered in the address book, and processing terminates.

<Processing in MFP 110>

Figure 6:
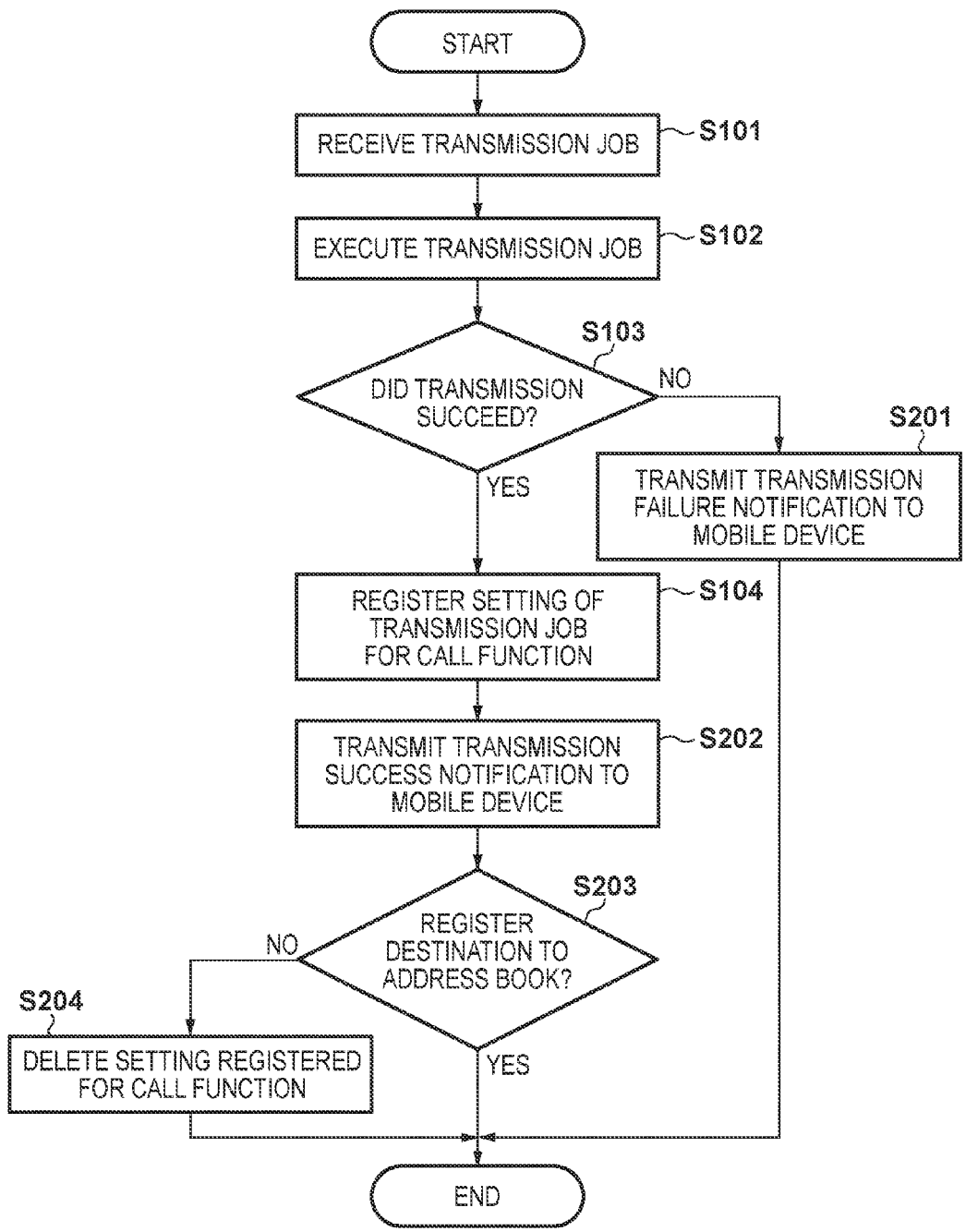
FIG. 6 is a flowchart illustrating a procedure of processing executed by an MFP according to the second embodiment.

FIG. 6 is a flowchart that illustrates a procedure for processing executed by the MFP 110 when a transmission job is input from the mobile device 120 according to the second embodiment. Note that processing of each step illustrated in FIG. 6 is realized in the MFP 110 by the CPU 11 reading and executing a control program stored in the ROM 13 or the storage 20.

Steps S101-S103 are similar to those of the first embodiment. If the CPU 11, in step S103, determines that the transmission succeeded, the CPU 11 advances the processing to step S104, and if the CPU 11 determines that the transmission failed, the CPU 11 advances the processing to step S201. In step S201, the CPU 11 transmits to the mobile device 120 a transmission failure notification indicating that transmission in accordance with the transmission job has failed, and processing terminates.

On the other hand, in step S104, the CPU 11 registers (saves) the setting of the executed transmission job, for the call function, and advances the processing to step S202. In step S202, the CPU 11 transmits to the mobile device 120 a transmission success notification indicating that transmission in accordance with the transmission job has succeeded, and advances the processing to step S203. In accordance with this transmission success notification, the CPU 11 queries the mobile device 120 as to whether to register the destination set in the FAX transmission job into the address book.

In step S203, the CPU 11 receives from the mobile device 120 a notification indicating whether to register the destination set in the transmission job into the address book. Furthermore, based on the received notification, the CPU 11 determines whether to register the destination included in the settings of the transmission job in the address book that the MFP 110 holds. If the CPU 11 determines to register the destination in the address book, the CPU 11 registers the destination in the address book, and terminates the processing. However, if the CPU 11 determines not to register the destination in the address book, it does not register the destination in the address book, and in step S204, the CPU 11 deletes the setting that was registered for the call function (in step S104), and terminates the processing.

By virtue of the present embodiment, similarly to the first embodiment, it is possible to control in accordance with an intention of a user whether to store a destination included in a transmission job as a setting history for a call function, without causing a security problem to be generated.

Third Embodiment

In the first and second embodiments, whether to save a destination in a setting history for the call function is controlled in accordance with whether to register a destination set in a transmission job into an address book. In contrast to this, in the third embodiment, explanation is given of an example of accepting from a user an instruction for whether to save a setting of a transmission job as a setting history for the call function. In the present embodiment, such acceptance processing is realized by accepting an instruction from a user via an operation screen displayed on the operation panel 14. Furthermore, in accordance with the accepted instruction, the CPU 11 determines whether to save the setting of the transmission job as a setting history for the call function. Note that, below, explanation is omitted for portions in common with the first and the second embodiment.

Figure 7:
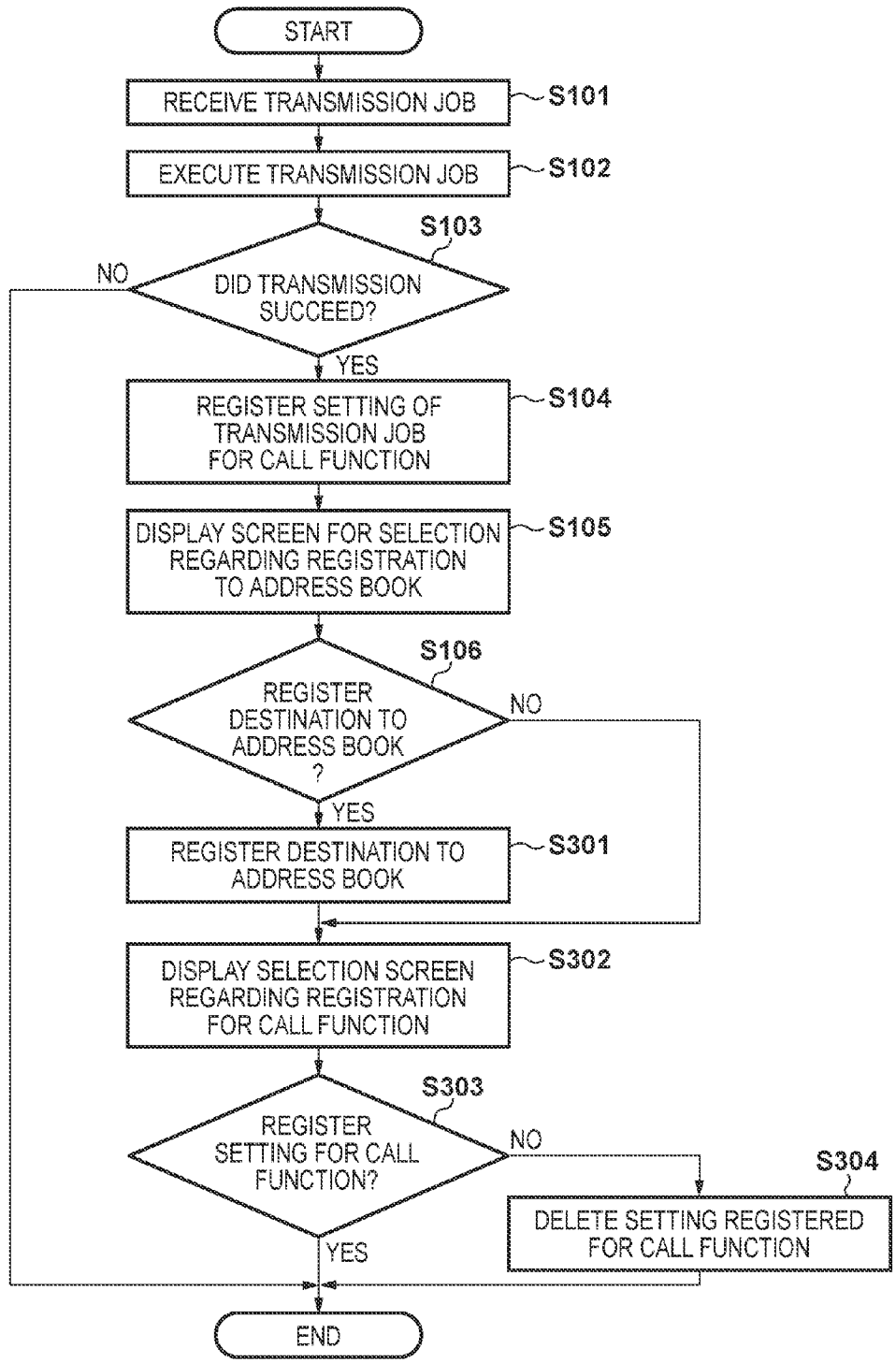
FIG. 7 is a flowchart illustrating a procedure of processing executed by an MFP according to a third embodiment.

Below, with reference to FIG. 7, explanation is given for a detailed processing procedure in the MFP 110. FIG. 7 is a flowchart that illustrates a procedure for processing executed by the MFP 110 when a transmission job is input from the mobile device 120 according to the third embodiment. Note that processing of each step illustrated in FIG. 7 is realized in the MFP 110 by the CPU 11 reading and executing a control program stored in the ROM 13 or the storage 20.

Steps S101-S106 are similar to those of the first embodiment. However, if the CPU 11 determines to register the destination in the address book in step S106, in step S301 the CPU 11 registers the destination in the address book and advances the processing to step S302; if the CPU 11 determines not to register, the CPU 11 advances the processing to step S302 without registering the destination in the address book.

Figure 8:
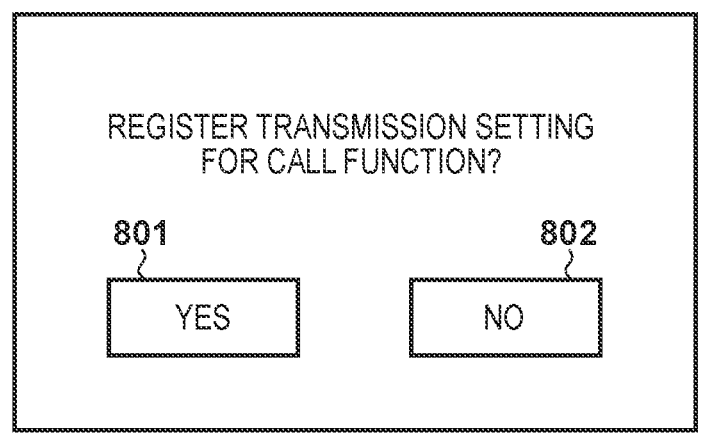
FIG. 8 is a view for illustrating an example of an operation screen displayed on the MFP or the mobile device.

In step S302, the CPU 11 displays, on the operation panel 14, a selection screen for selecting whether to save (register) the destination included in the settings of the transmission job as a setting history for the call function. FIG. 8 illustrates an example of such a selection screen, and in the selection screen, a user can select whether to register or not register the destination as a setting history for the call function by pressing a key 801 or a key 802.

Next, in step S303, in accordance with the selection by the user using the selection screen displayed in step S302, the CPU 11 determines whether to save (register) the destination included in the setting of the transmission job as the setting history for the call function. If the CPU 11 determines to register the destination as a setting history for the call function, the CPU 11 terminates the processing; if the CPU 11 determines to not register, the CPU 11 deletes the setting registered for the call function (in step S104), and terminates the processing.

By virtue of the present embodiment, similarly to the first and second embodiments, it is possible to control in accordance with an intention of a user whether to store a destination included in a transmission job as a setting history for a call function, without causing a security problem to be generated.

Fourth Embodiment

In a fourth embodiment, as a variation of the third embodiment, explanation is given of an example in which an instruction by a user for whether to register a destination set in a transmission job in an address book in the MFP 110 is received from the mobile device 120. Specifically, when executing a transmission job received from the mobile device 120, the CPU 11 queries the mobile device 120 as to whether to save the destination set in the transmission job as a setting history for the call function. Furthermore, the CPU 11 receives from the mobile device 120 an instruction by a user for as to whether to save the destination as a setting history for the call function. Note that, below, explanation is omitted for portions in common with the first through third embodiments.

<Processing in Mobile Device 120>

Figure 9:
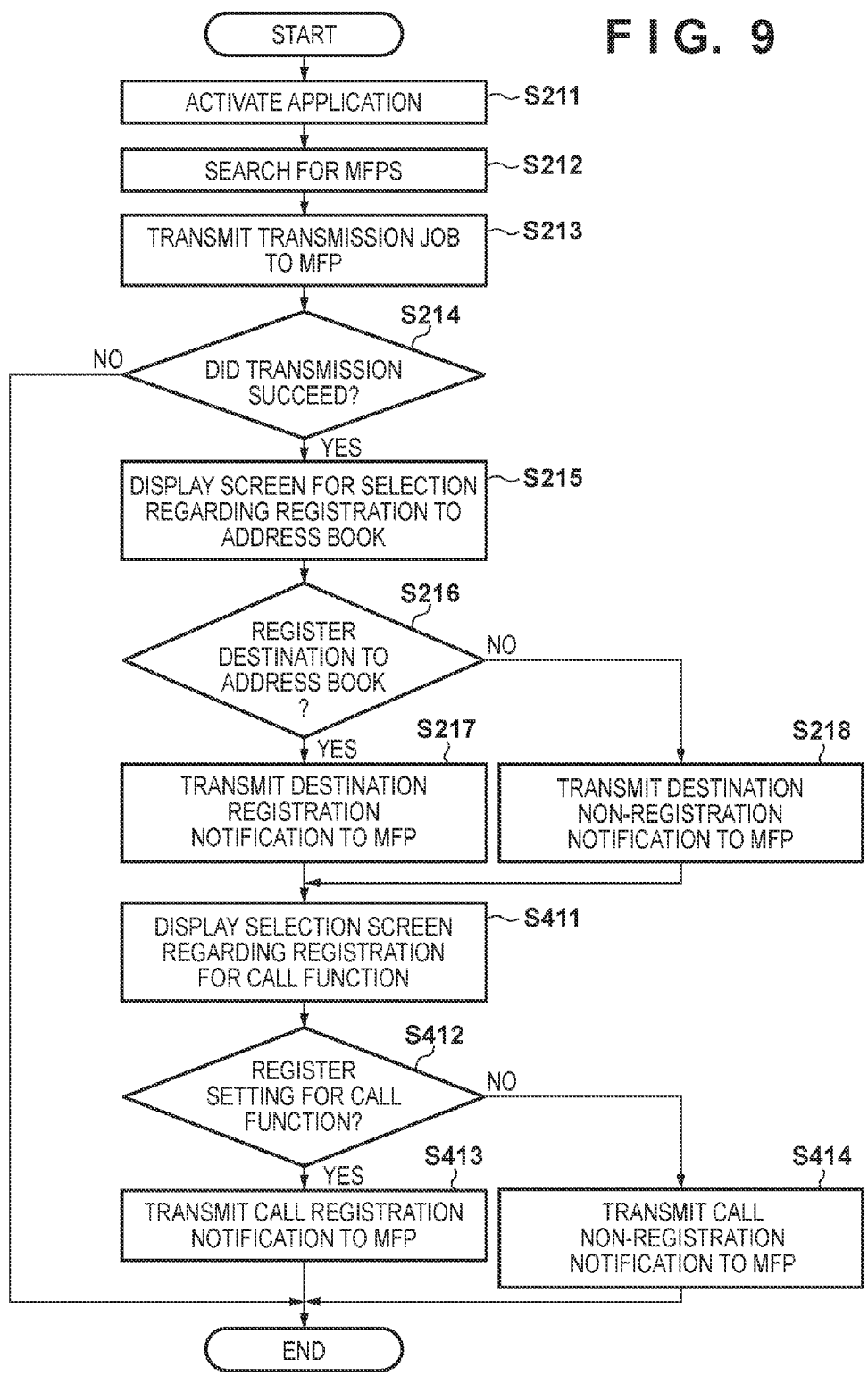
FIG. 9 is a flowchart illustrating a procedure of processing executed by the mobile device according to according to a fourth embodiment.

FIG. 9 is a flowchart illustrating a procedure of processing executed by the mobile device 120 according to according to the fourth embodiment. Note that processing of each step illustrated in FIG. 9 is realized in the mobile device 120 by the CPU 21 reading and executing a program stored in the ROM 23 or the storage 26. In addition, in the present embodiment, similarly to the first embodiment, explanation is given of an example in which, as a transmission job, a FAX transmission job is executed by the MFP 110.

Steps S211-S218 are similar to those of the second embodiment. After the processing of step S217 or step S218, the CPU 21, next in step S411, displays a selection screen as illustrated in FIG. 8, and a user can select to register the destination set in the transmission job as a setting history for the call function, or to not register, by pressing the key 801 or the key 802 in the selection screen.

Next, in step S412, in accordance with the selection by the user using the selection screen displayed in step S411, the CPU 21 determines whether to register the destination included in the setting of the transmission job in the MFP 110 as a setting history for the call function. If the CPU 21 determines to register the destination, in step S413, it transmits to the MFP 110 a call registration notification that indicates that the destination is to be registered as a setting history for the call function, and terminates the processing. However, if the CPU 21 determines not to register the destination, in step S414, it transmits to the MFP 110 a call non-registration notification that indicates that the destination is not to be registered as a setting history for the call function, and terminates the processing.

<Processing in MFP 110>

Figure 10:
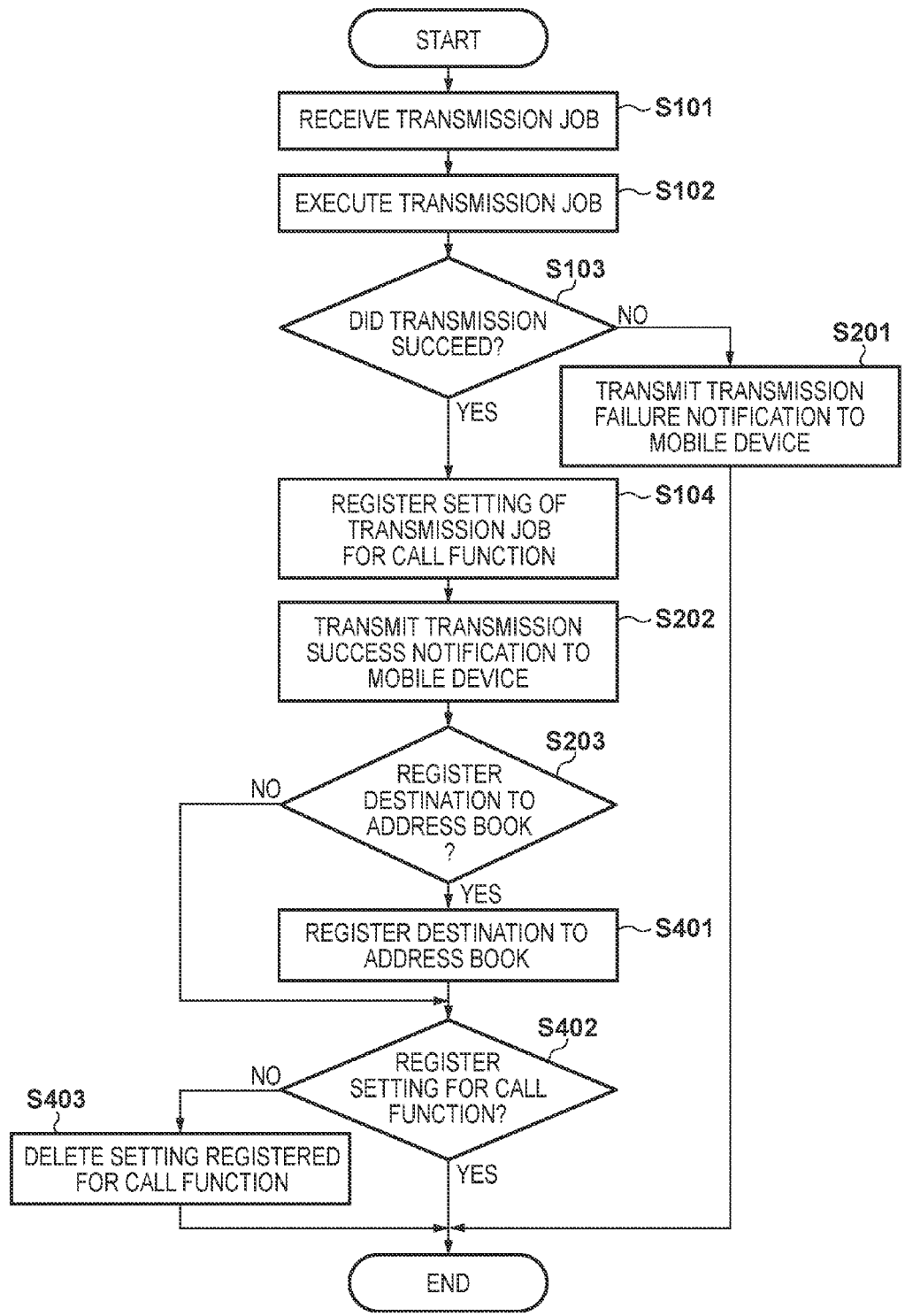
FIG. 10 is a flowchart illustrating a procedure of processing executed by an MFP according to according to the fourth embodiment.

FIG. 10 is a flowchart that illustrates a procedure for processing executed by the MFP 110 when a transmission job is input from the mobile device 120 according to the fourth embodiment. Note that processing of each step illustrated in FIG. 10 is realized in the MFP 110 by the CPU 11 reading and executing a control program stored in the ROM 13 or the storage 20.

Steps S101-S104 and S201-S203 are similar to those of the second embodiment. If the CPU 11 determines to register the destination in the address book in step S203, in step S401, the CPU 11 registers the destination in the address book and advances the processing to step S402; on the other hand, if the CPU 11 determines not to register, the CPU 11 advances the processing to step S402 without registering the destination in the address book.

In step S402, in accordance with the call non-registration notification or the call registration notification transmitted from the mobile device 120, the CPU 11 determines whether to register the destination set in the transmission job as a setting history for the call function. Furthermore, if the CPU 11 determines not to register the destination in the setting history, in step S403, it deletes the setting registered for the call function (in step S104), and terminates the processing.

By virtue of the present embodiment, similarly to the first through third embodiments, it is possible to control in accordance with an intention of a user whether to store a destination included in a transmission job as a setting history for a call function, without causing a security problem to be generated.

OTHER EMBODIMENTS

The above-described embodiments exemplify that the mobile device 120 causes the MFP 110 to execute a FAX transmission job. However, the above-described embodiments can also be applied to cases where the MFP 110 executes a transmission job such as an electronic mail transmission job, as well as a FAX transmission job.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047414, filed Mar. 10, 2015, which is hereby incorporated by reference herein in its entirety.

What is claimed is:

1. An image forming apparatus comprising:
a storage device that stores a transmission history that includes a transmission destination of data and a corresponding transmission setting used in transmission of the data to the transmission destination; and
at least one processor coupled to the storage device and programmed to provide:
a transmission unit configured to transmit data to the transmission destination;
a display control unit configured to display, on a display device, a screen for accepting a user instruction as to whether or not to store the transmission history that includes the transmission destination when the transmission unit completes the transmission processing, wherein the display control unit performs display control to display the screen for accepting the user instruction on the display device in a case where the transmission unit succeeds in the transmission processing and not to display the screen for accepting the user instruction on the display device in a case where the transmission unit fails in the transmission processing;
a storing control unit configured to control to store, in the storage device, the transmission history that includes the transmission destination used in the transmission processing in a case where the user instruction indicating to store the transmission history that includes the transmission destination is accepted via the screen, and not to store, in the storage device, the transmission history that includes the transmission destination used in the transmission processing in a case where the user instruction indicating not to store the transmission history that includes the transmission destination is accepted via the screen or in the case where the transmission unit fails in the transmission processing; and
a setting unit configured to, based on acceptance of a user instruction to use the transmission history stored in the storage device, obtain a transmission destination and the corresponding transmission setting used in previous transmission processing and included in the stored transmission history, and set the obtained transmission destination as a transmission destination to be used for transmission, and set the obtained transmission setting as a transmission setting to be used for transmission by the transmission unit.

2. The image forming apparatus according to claim 1, wherein the transmission setting includes at least a setting for a facsimile cover sheet.

3. A method of controlling an image forming apparatus, the method comprising:
- storing, in a storage device, a transmission history that includes a transmission destination of data and a corresponding transmission setting used in transmission of the data to the transmission destination;
- transmitting data to the transmission destination;
- displaying, on a display device, a screen for accepting a user instruction as to whether or not to store the transmission history that includes the transmission destination when the transmitting step completes the transmission processing, wherein the displaying step displays the screen for accepting the user instruction on the display device in a case where the transmitting step succeeds in the transmission processing and does not display the screen for accepting the user instruction on the display device in a case where the transmitting step fails in the transmission processing;
- controlling to store, in the storage device, the transmission history that includes the transmission destination used in the transmission processing in a case where the user instruction indicating to store the transmission history that includes the transmission destination is accepted via the screen, and not to store, in the storage device, the transmission history that includes the transmission destination used in the transmission processing in a case where the user instruction indicating not to store the transmission history that includes the transmission destination is accepted via the screen or in the case where the transmitting step fails in the transmission processing;
- obtaining, based on acceptance of a user instruction to use the transmission history stored in the storage device, a transmission destination and the corresponding transmission setting used in previous transmission processing and included in the stored transmission history;
- setting the obtained transmission destination as a transmission destination to be used for transmitting; and
- setting the obtained transmission setting as a transmission setting to be used for transmitting in the transmitting step.

4. A non-transitory computer-readable storage medium storing a computer program for causing a computer to execute a method of controlling an image forming apparatus, the method comprising:
- storing, in a storage device, a transmission history that includes a transmission destination of data and a corresponding transmission setting used in transmission of the data to the transmission destination;
- transmitting data to the transmission destination;
- displaying, on a display device, a screen for accepting a user instruction as to whether or not to store the transmission history that includes the transmission destination when the transmitting step completes the transmission processing, wherein the displaying step displays the screen for accepting the user instruction on the display device in a case where the transmitting step succeeds in the transmission processing and does not display the screen for accepting the user instruction on the display device in a case where the transmitting step fails in the transmission processing;
- controlling to store, in the storage device, the transmission history that includes the transmission destination used in the transmission processing in a case where the user instruction indicating to store the transmission history that includes the transmission destination is accepted via the screen, and not to store, in the storage device, the transmission history that includes the transmission destination used in the transmission processing in a case where the user instruction indicating not to store the transmission history that includes the transmission destination is accepted via the screen or in the case where the transmitting step fails in the transmission processing;
- obtaining, based on acceptance of a user instruction to use the transmission history stored in the storage device, a transmission destination and the corresponding transmission setting used in previous transmission processing and included in the stored transmission history;
- setting the obtained transmission destination as a transmission destination to be used for transmitting; and
- setting the obtained transmission setting as a transmission setting to be used for transmitting in the transmitting step.

5. An information processing apparatus for communicating with an image forming apparatus, comprising:
- at least one processor coupled to a storage device and programmed to provide:
  - a sending unit configured to send a facsimile destination and a facsimile transmission setting to the image forming apparatus via a wireless communication based on IEEE802.11 standard, wherein the image forming apparatus transmits image data to a facsimile apparatus different from the image forming apparatus in accordance with the facsimile destination and the transmission setting received from the information processing apparatus;
  - a reception unit configured to receive, from the image forming apparatus, a result of facsimile data transmission to the transmission destination via the wireless communication;
  - a display control unit configured to display, on a display device, a screen for accepting a user instruction as to whether or not to register a setting of the data transmission as a transmission history in accordance with the reception of the result of the data transmission; and
  - a control unit configured to send, to the image forming apparatus, a registration request for registering the transmission history of the data transmission in a case where the user instruction indicating to register the setting of the data transmission as the transmission history is accepted via the screen, and to send, to the image forming apparatus, a registration cancellation request for not registering the transmission history of the data transmission in a case where the user instruction indicating not to register the setting of the data transmission as the transmission history is accepted via the screen,
  - wherein the image forming apparatus is allowed to, based on a user instruction for using the transmission history registered in accordance with the registration request, obtain the registered setting of the facsimile data transmission to set at least a facsimile destination and a facsimile transmission setting to be used in facsimile data transmission.

6. The information processing apparatus according to claim 5, wherein the display control unit performs display control not to display the screen for accepting the user instruction on the display device in a case where the result of the data transmission indicates a transmission failure.

* * * * *